United States Patent [19]
Sasaya

[11] Patent Number: 5,223,995
[45] Date of Patent: Jun. 29, 1993

[54] CASSETTE LOADING APPARATUS HAVING A CASSETTE INSERTION DETECTING SWITCH MOUNTED ON A STATIONARY SECTION OF THE APPARATUS

[75] Inventor: Takashi Sasaya, Kanagawa, Japan

[73] Assignee: Sony Corporation, Tokyo, Japan

[21] Appl. No.: 828,569

[22] Filed: Jan. 31, 1992

[30] Foreign Application Priority Data

Feb. 6, 1991 [JP] Japan ................... 3-035086

[51] Int. Cl.$^5$ ................ G11B 5/008; G11B 16/50
[52] U.S. Cl. ................. 360/96.5; 360/99.06; 242/199
[58] Field of Search ............. 360/92, 93, 96.5, 96.6, 360/99.02, 99.03, 99.06, 99.07; 369/77.1, 77.2; 242/197-200

[56] References Cited

U.S. PATENT DOCUMENTS

| | | | |
|---|---|---|---|
| 3,385,534 | 5/1968 | Staar | 242/198 |
| 3,659,857 | 5/1972 | Marcinkus | 360/92 |
| 3,669,457 | 6/1972 | Nozawa et al. | 360/93 |
| 3,807,653 | 4/1974 | Van Der Maaden | 360/96.5 |
| 4,811,138 | 3/1989 | Park | 360/96.6 |
| 4,868,693 | 9/1989 | Tsutsumi et al. | 360/96.5 |
| 4,979,061 | 12/1990 | Kishimoto et al. | 360/96.5 |
| 5,060,094 | 10/1991 | Chung et al. | 360/96.5 |
| 5,063,463 | 11/1991 | Kox | 360/96.5 |
| 5,109,649 | 5/1992 | Azzaroni | 414/411 |

FOREIGN PATENT DOCUMENTS

| | | | |
|---|---|---|---|
| 54-10706 | 1/1979 | Japan | 360/96.5 |
| 57-205850 | 12/1982 | Japan | 360/96.5 |
| 60-111360 | 6/1985 | Japan | |

*Primary Examiner*—Stuart S. Levy
*Assistant Examiner*—Jefferson Evans
*Attorney, Agent, or Firm*—William S. Frommer; Alvin Sinderbrand

[57] ABSTRACT

A cassette loading apparatus which eliminates a harness for the electric connection to a cassette insertion detecting switch. The cassette loading apparatus comprises a parallel quadrilateral link mechanism including first and second parallel links and third and fourth parallel links. A connecting pin between the first and third links is mounted on a stationary member on which the cassette insertion detecting switch is mounted. A switch operating element is provided on the third link for operating the cassette insertion detecting switch between on- and off-states. The first and second links have elongated holes formed along the length therein, and fitting pins on an actuating lever are loosely fitted in the elongated holes such that the actuating lever extends in parallel to the third link. The actuating lever is mounted for pivotal motion on a cassette holder by means of the first fitting pin and is positioned so as to be operated by a cassette inserted into the cassette holder to move between a cassette non-insertion detecting position and a cassette insertion detecting position to operate the switch operating element.

4 Claims, 6 Drawing Sheets

CASSETTE LOADING APPARATUS HAVING A CASSETTE INSERTION DETECTING SWITCH MOUNTED ON A STATIONARY SECTION OF THE APPARATUS

BACKGROUND OF THE INVENTION

1. Field of the Invention

This invention relates to a cassette loading apparatus suitable for use with a video tape recorder and the like, and more particularly to a cassette loading apparatus of the type wherein a cassette insertion detecting switch is operated into an on-state by a cassette inserted into a cassette holder.

2. Description of the Prior Art

A cassette loading apparatus for use with a video tape recorder of the front loading type is conventionally known and disclosed, for example, in Japanese Patent Laid-Open Application No. 60-111360, as including a cassette holder for moving a cassette between a cassette receiving position at which a cassette is inserted into or removed from the cassette holder and a cassette playing position at which recording or reproduction of video signals on a tape in a cassette is performed, and a cassette insertion detecting switch for detecting insertion of a cassette into the cassette holder to cause the cassette holder to start its movement from the cassette receiving position to the cassette playing position.

An exemplary conventional cassette loading apparatus is shown in FIGS. 5 and 6 to include a cassette holder 2 for receiving a cassette 1 therein, a cassette insertion detecting switch 3 in the form of a photocoupler or the like mounted on one of a pair of side walls 2a of the cassette holder 2, and a switch operating member 4 mounted on a bottom wall 2b of the cassette holder 2 for operating the cassette detecting switch 3 between on- and off-states. The cassette insertion detecting switch 3 is electrically connected by way of a flexible harness 5 to a cassette insertion detecting circuit (not shown) mounted on a stationary section of the video tape recorder.

When a cassette 1 is inserted in the direction indicated by an arrow a in FIG. 5 into the cassette holder 2 at its cassette receiving position as indicated by a solid line in FIG. 5, the switch operating member 4 is pushed to move in the direction of the arrow a by the cassette 1 against a return spring 6, whereupon the cassette insertion detecting switch 3 is operated from an off-state into an on-state by the cassette 1.

Consequently, a motor (not shown) of a cassette holder actuating apparatus (not shown) is rendered operative so that the cassette holder 2 is first drawn horizontally in the direction indicated by an arrow b from the cassette receiving position shown in FIG. 5 and then moved down vertically in the direction indicated by an arrow c to a cassette playing position shown in FIG. 6 for the recording/reproduction of video signals on a tape in the cassette 1 under the guidance of a plurality of guide rollers 7 mounted on the side walls 2a of the cassette holder 2 and a plurality of L-shaped guideways 9 formed in a pair of guide plates 8 mounted vertically on the chassis (not shown) and cooperating individually with the guide rollers 7. By such movement of the cassette holder 2, the cassette 1 is first drawn in the direction of the arrow b and then moved down vertically in the direction of the arrow c so that it is automatically loaded to its cassette playing position.

However, if a situation occurs that, after the cassette holder 2 starts its movement in the direction of the arrow b, the cassette 1 is, for example, inadvertently held by hand to cause the cassette holder 2 to leave the cassette 1 at the cassette receiving position, then the switch operating member 4 is returned in the direction indicated by an arrow a' by the spring 6 to cause the cassette insertion detecting switch 3 to be switched back into an off-state. Consequently, the motor is now driven reversely so that the cassette holder 2 is immediately returned in the direction indicated by an arrow b' to the cassette receiving position.

Such conventional cassette loading apparatus, however, is disadvantageous in that, since the harness 5 undergoes stress by expansion and flexure each time the cassette holder 2 is moved between the cassette receiving position and the cassette playing position, the harness 5 is short lived and relatively lacking in reliability.

SUMMARY OF THE INVENTION

It is an object of the present invention to provide a cassette loading apparatus which eliminates the need for a harness for the electric connection to a cassette insertion detecting switch.

In order to attain the above object, according to the present invention, there is provided a cassette loading apparatus, which comprises a cassette holder for moving a cassette between a cassette receiving position at which a cassette is inserted into or removed from the cassette holder and a cassette playing position at which signals may be recorded or reproduced on a tape in the cassette, a cassette insertion detecting switch mounted on a stationary section for detecting insertion of a cassette into the cassette holder, a parallel quadrilateral link mechanism including first, second, third and fourth links connected for pivotal motion relative to each other by first, second, third and fourth connecting pins so as to form a parallelogram in which the first and second links extend in parallel to each other while the third and fourth links extend in parallel to each other, the first connecting pin being mounted on the stationary section, the first link being connected to the first connecting pin, the first and second links having first and second elongated holes formed along the length thereof, respectively, a switch operating element provided on the third link connected to the first connecting pin for operating the cassette insertion detecting switch between on- and off-states upon pivotal motion of the third link around the first connecting pin, and an actuating lever having first and second fitting pins secured thereto and loosely fitted in the first and second elongated holes of the first and second links, respectively, in such a manner as to extend in parallel to the third link, the actuating lever being mounted for pivotal motion on the cassette holder by means of the first fitting pin, the actuating lever being positioned so as to be operated by a cassette inserted into the cassette holder to move between a cassette non-insertion detecting position at which the cassette insertion detecting switch assumes an off-state and a cassette insertion detecting position at which the cassette insertion detecting switch assumes an on-state.

With the cassette loading apparatus described above, since the cassette insertion detecting switch for detecting insertion of a cassette into the cassette holder which is moved between the cassette receiving position and the cassette playing position is mounted on the stationary section, a flexible harness for establishing electric connection to the cassette insertion detecting switch can be eliminated. Accordingly, the cassette loading apparatus is quite free from the problem of deterioration in life or duration of a harness by distortion and accordingly is improved remarkably in durability and reliability.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 2:
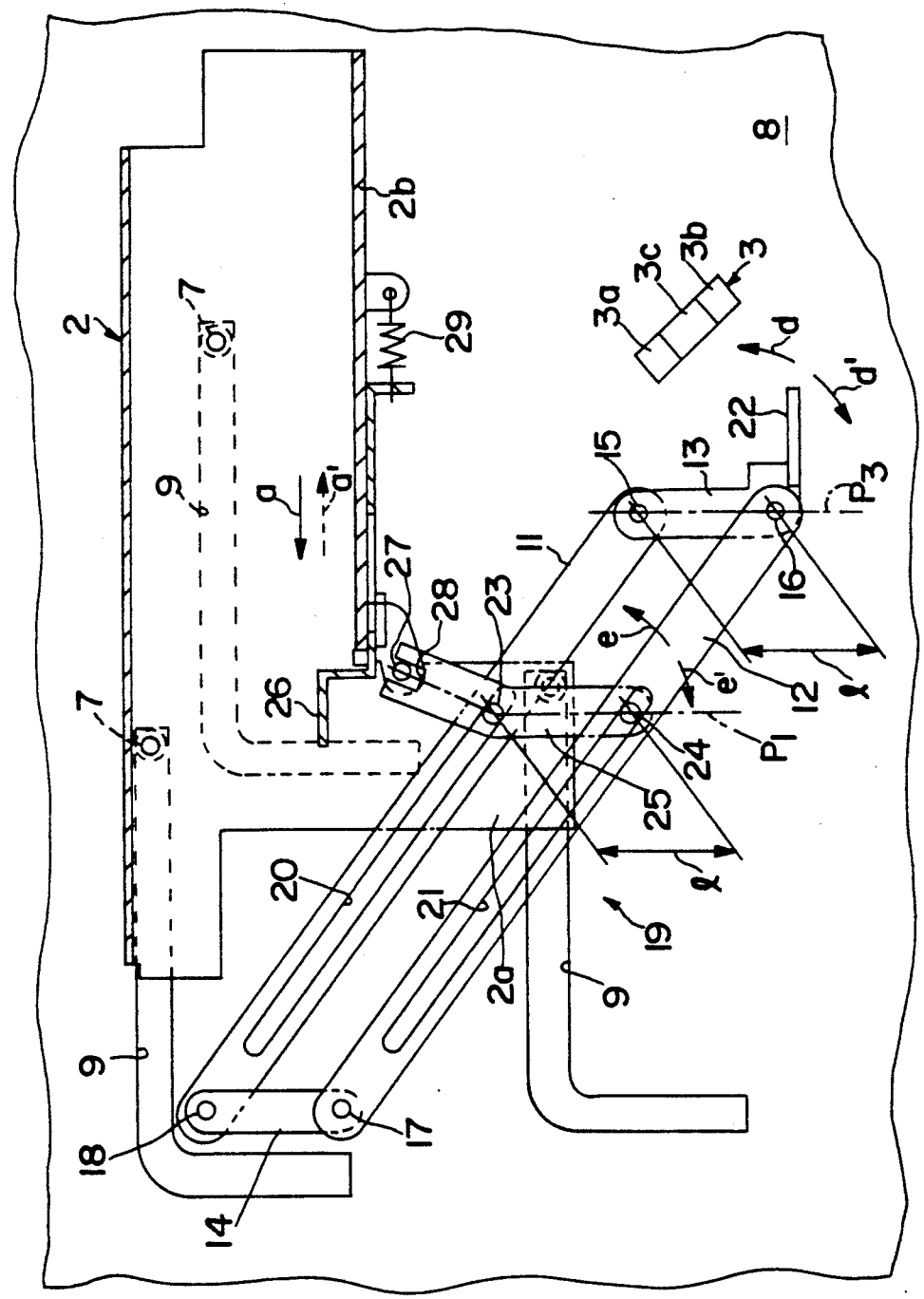
FIG. 2 is a side elevational view, partly in section, of a cassette loading apparatus according to a preferred embodiment of the present invention and which is shown before insertion of a cassette therein.

Referring first to FIG. 2, there is shown a cassette loading apparatus to which the present invention is applied. The cassette loading apparatus includes a parallel quadrilateral link mechanism 19 including first and second comparatively long links 11 and 12 and third and fourth comparatively short links 13 and 14 connected for pivotal motion to each other by first, second, third and fourth connecting pins 15, 16, 17 and 18 so as to form a parallelogram. The first connecting pin 15 is mounted on one of a pair of guide plates 8 serving as a stationary section of a video tape recorder in which the cassette loading apparatus is incorporated, and consequently, the first connecting pin 15 serves as a fixed fulcrum. A first elongated hole 20 is formed along the length of the first link 11 and slidably receives the first connecting pin 15 while a second elongated hole 21 is formed along the length of the second link 12 which extends in parallel to the first link 11.

A cassette insertion detecting switch 3 which may be a photocoupler or the like is mounted on the guide plate 8 in the neighborhood of the first connecting pin 15. A switch operating element 22 in the form of a shutter plate is provided integrally on the third link 13 which connected to the first connecting pin 15 such that, when the third link 13 is pivoted in the direction indicated by an arrow d or d' around the first connecting pin 15, the switch operating element 22 moves into or out of a gap 3c between a light emitting element 3a and a light receiving element 3b of the cassette insertion detecting switch 3 to operate the cassette insertion detecting switch 3 between on- and off-states.

An actuating lever 25 has first and second fitting pins 23 and 24 secured thereto and loosely fitted in the first and second elongated holes 20 and 21 of the first and second links 11 and 12, respectively, such that the actuating lever 25 extends in parallel to the third link 13. The actuating lever 25 is mounted for pivotal motion in the direction indicated by an arrow e or e' on one of a pair of side walls 2a of a cassette holder 2 by means of the first fitting pin 23. A cassette insertion detecting member 26 is mounted for sliding movement in the direction indicated by an arrow a or a' on a bottom wall 2b of the cassette holder 2. The cassette insertion detecting member 26 is connected to an upper end of the actuating lever 25 by means of a pin-and-slot connection including a connecting pin 27 mounted on the detecting member 26 and an elongated hole or slot 28 formed in the actuating lever 25. The cassette insertion detecting member 26 is normally biased in the direction of the arrow a' by a return spring 29 to normally bias the actuating lever 25 in the direction of the arrow e'. It is to be noted that the length l of the actuating lever 25 between the first and second fitting pins 23 and 24 is equal to the length l of the third link 13 between the first and second connecting pins 15 and 16.

Operation of the cassette loading apparatus will be described subsequently.

Figure 1A:
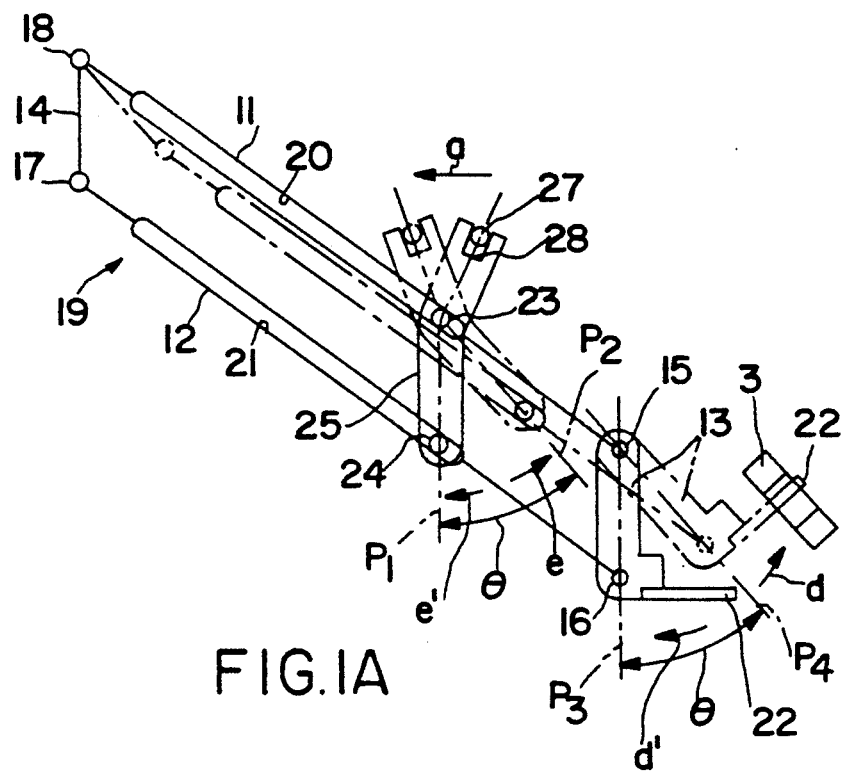
FIGS. 1(A) and 1(B) are diagrammatic representations illustrating a principle of operation of a cassette loading apparatus according to the present invention.

When the cassette holder 2 is returned to the cassette receiving position shown in FIGS. 1(A) and 2, the cassette insertion detecting member 26 is returned in the direction of the arrow a' by the spring 29 so that the actuating lever 25 is pivoted back in the direction of the arrow e' to its cassette non-insertion detecting position P1 shown in FIG. 2 around the pin 23 by way of the connecting pin 27. Thereupon, the second link 12 of the parallel quadrilateral link mechanism 19 is actuated in the direction of the arrow e' by the pin 24 of the actuating lever 25 until the third link 13 is pivoted back in the direction of the arrow d' around the pin 15 to its switch non-operating position P3 at which it extends in parallel to the actuating lever 25. Thus, when the cassette loading apparatus is at its home position, the various components thereof are at the respective positions described above.

Figure 3:
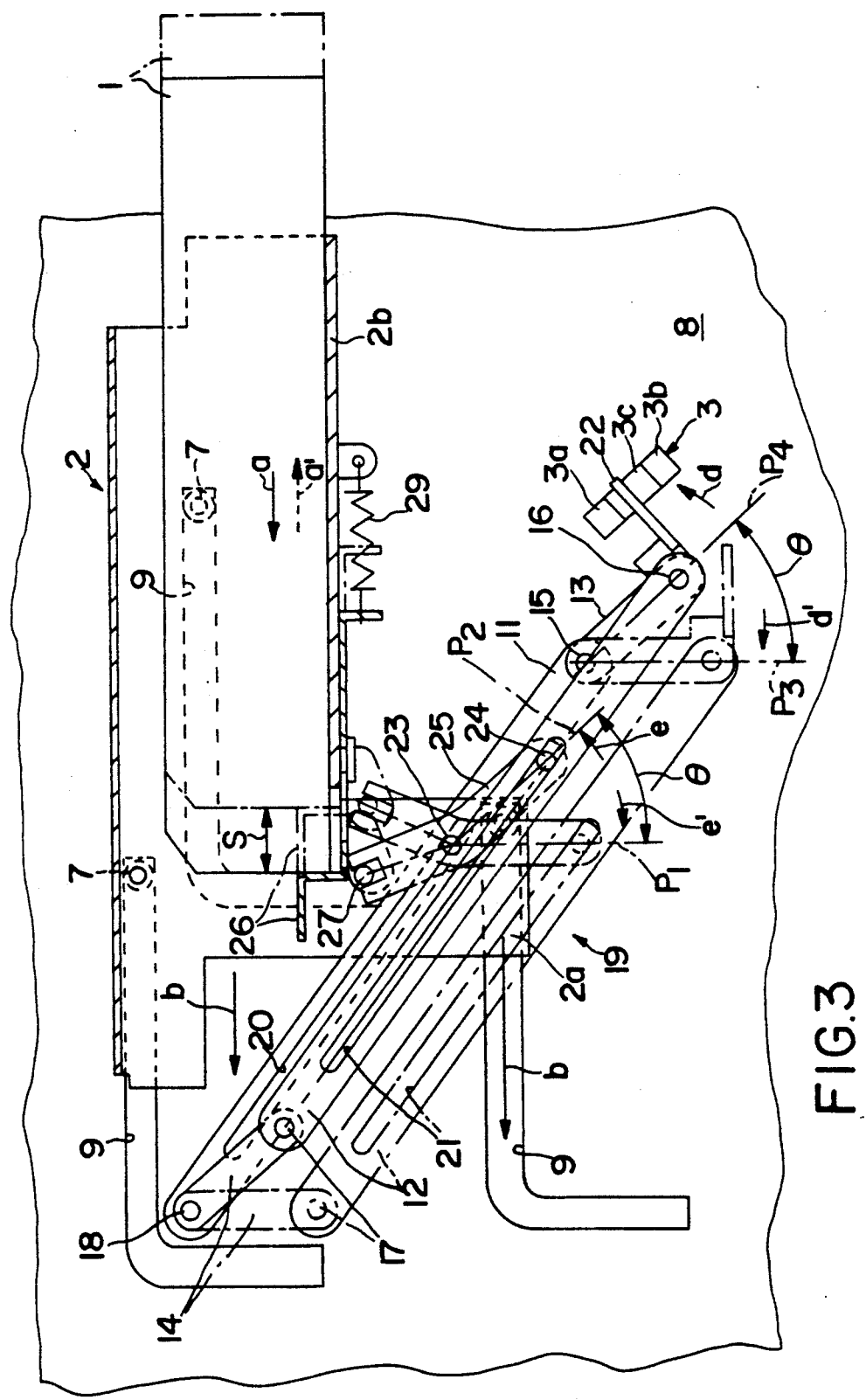
FIG. 3 is a similar view but showing the cassette loading apparatus after insertion of a cassette.

When a cassette 1 is inserted in the direction of the arrow a into the cassette holder 2 at the cassette receiving position as indicated by a solid line in FIG. 3 while the cassette loading apparatus is at its home position, the cassette insertion detecting member 26 is first pushed by the cassette 1 to move in the direction of the arrow a by a distance S against the spring 29.

Thereupon, the actuating lever 25 is pivoted in the direction of the arrow e by an angle θ to its cassette insertion detecting position P2 around the pin 23 by way of the connecting pin 27 as seen in FIGS. 1(A) and 3.

Consequently, the second link 12 of the parallel quadrilateral link mechanism 19 is actuated in the direction of the arrow e by the pin 24 of the actuating lever 25 to bodily move toward the first link 11 so that the third link 13 is pivoted in the direction of the arrow d by the same angle θ around the first connecting pin 15 to its switch operating position P4 at which it extends in parallel to the actuating lever 25. Thereupon, the switch operating element 22 on the third link 13 is inserted into the gap 3c of the cassette insertion detecting switch 3 to intercept light directed from the light emitting element 3a to the light receiving element 3b of the cassette insertion detecting switch 3 and thereby switch the cassette insertion detecting switch 3 into an on-state.

Figure 4:
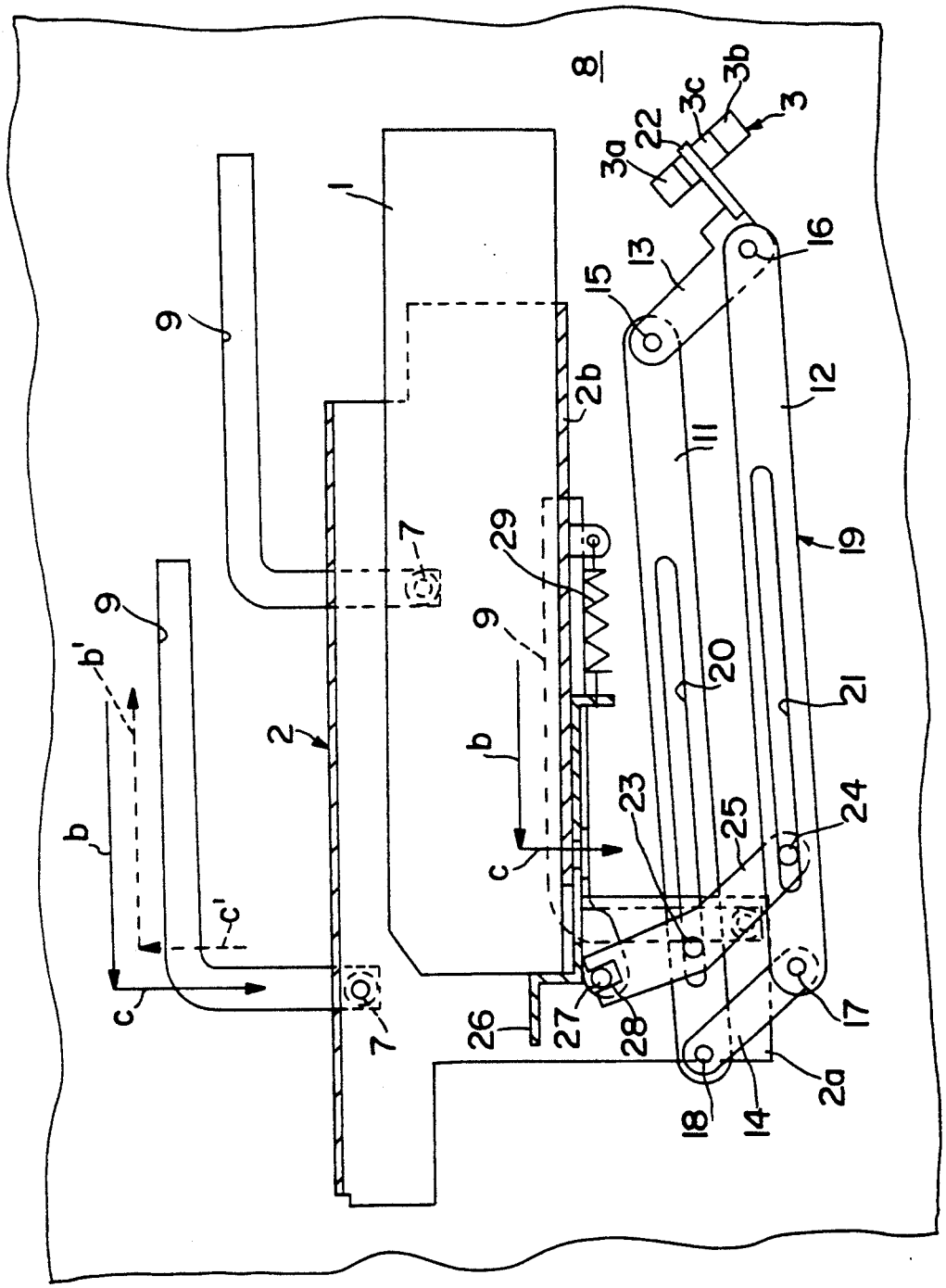
FIG. 4 is a similar view but showing the cassette loading apparatus when a cassette is loaded at a cassette playing position.
Figure 5:
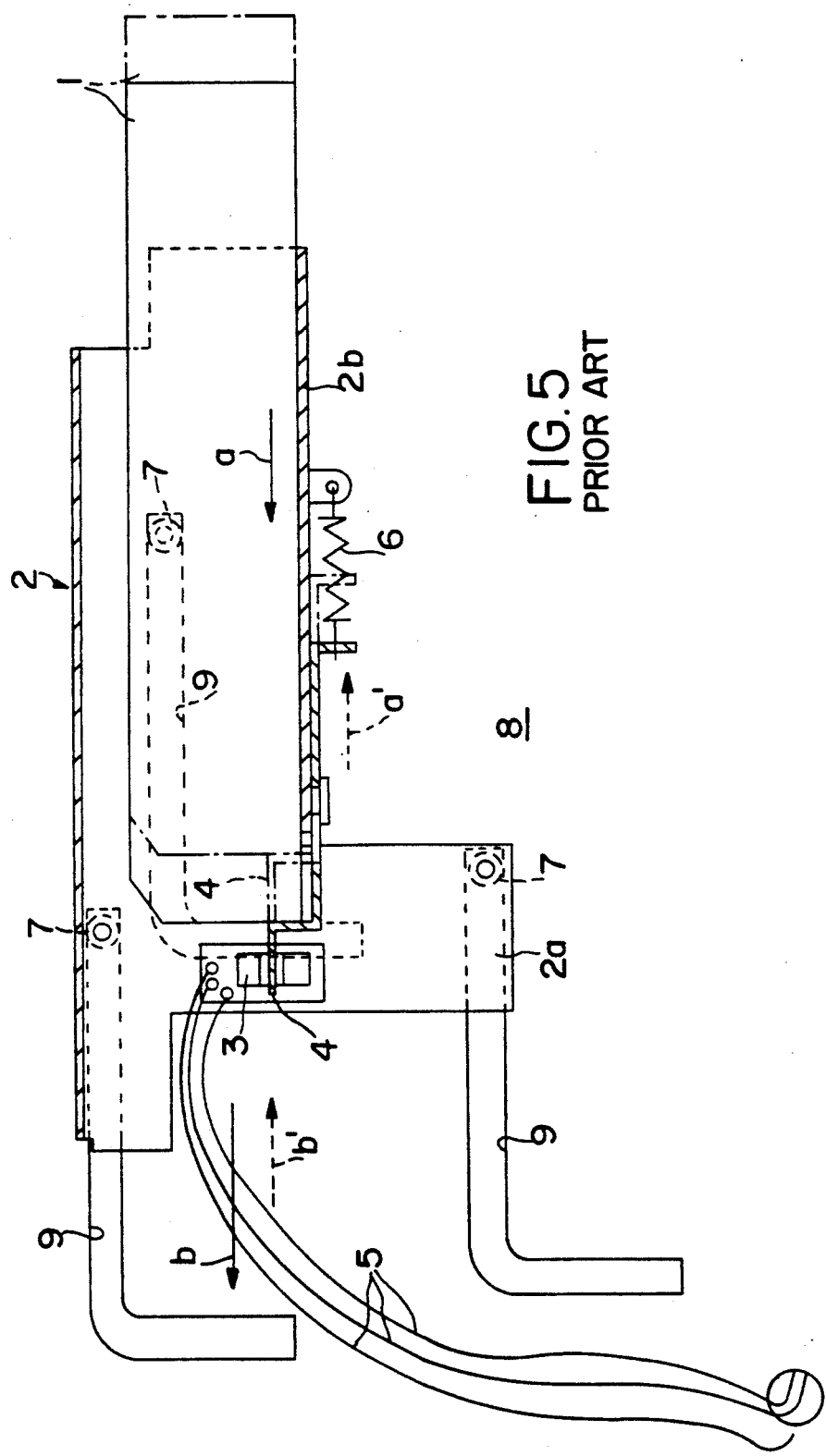
FIG. 5 is a side elevational view, partly in section, showing a conventional cassette loading apparatus before insertion of a cassette.
Figure 6:
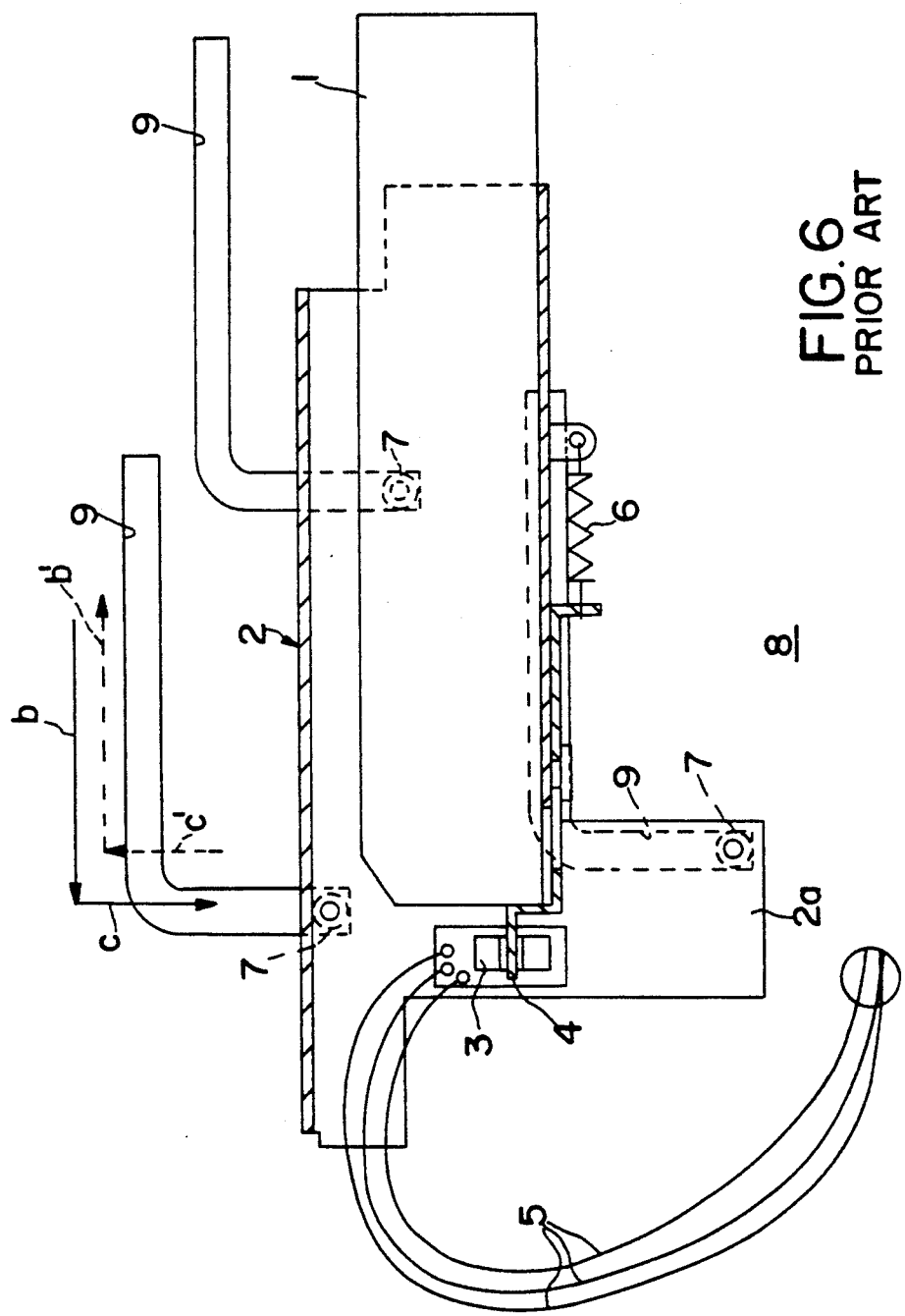
FIG. 6 is a similar view but showing the conventional cassette loading apparatus when a cassette is loaded at a cassette playing position.

In response to the cassette insertion detecting switch 3, a motor (not shown) of a cassette holder actuating mechanism (not shown) is rendered operative so that the cassette holder 2 is first drawn in horizontally in the direction of the arrow b shown in FIG. 4 from the cassette receiving position of FIG. 3 and then parallelly moved vertically downwardly in the direction of the arrow c to the cassette playing position of FIG. 4 under the guidance of a plurality of guide rollers 7 mounted on the side walls 2a of the cassette holder 2 and a plurality of guideways 9 formed in the stationary guide plate 8 and cooperating with the guide rollers 7. By such movement of the cassette holder 2, the cassette 1 is automatically loaded to the cassette playing position.

Figure 1B:
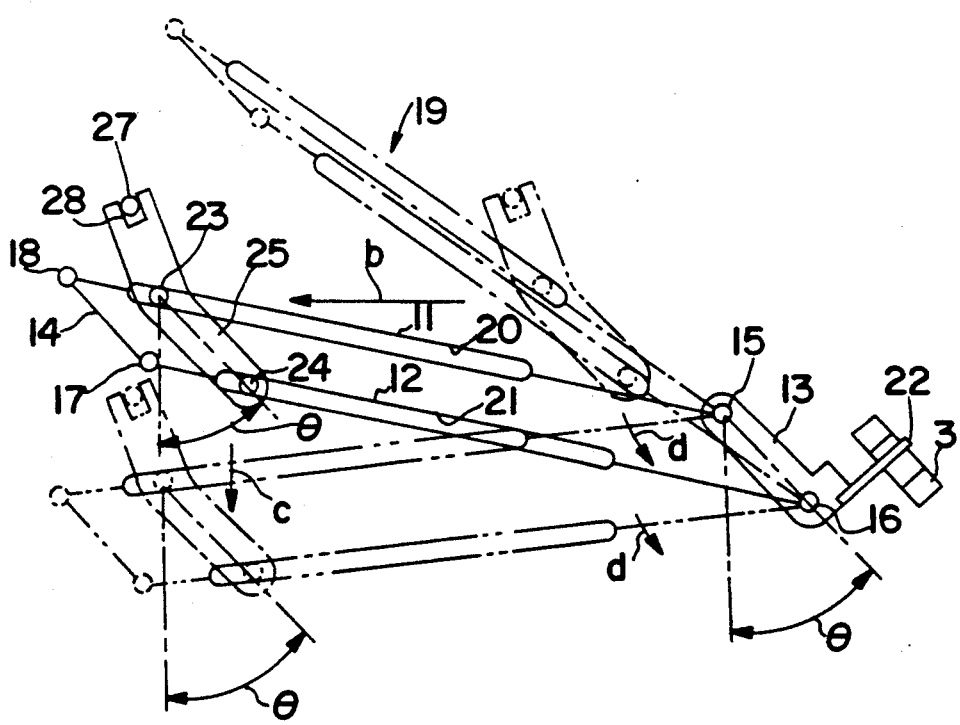

During such operation, the actuating lever 25 is parallelly moved such that it is first drawn in horizontally in the direction of the arrow b together with the cassette holder 2 maintaining the angle $\theta$ thereof while the pins 23 and 24 thereon are slidably moved in the first and second elongated holes 20 and 21 of the first and second links 11 and 12, respectively, of the parallel quadrilateral link mechanism 19 as seen in FIG. 1(B) and then moved vertically downwardly in the direction of the arrow c also maintaining the angle $\theta$.

Accordingly, during such parallel movement of the actuating lever 25 in the direction of the arrow b and then of the arrow c, the lever 25 maintains its posture parallel to the third link 13 of the parallel quadrilateral link mechanism 19. Consequently, while the first and second links 11 and 12 are parallelly pivoted in the direction of the arrow d around the first and second connecting pins 15 and 16, respectively, the angle $\theta$ of the third link 13 is maintained, and consequently, the third link 13 is left at its switch operating position P4. Accordingly, the cassette insertion detecting switch 3 maintains its on-state during such parallel movement of the actuating lever 25.

It is to be noted that, when the cassette holder 2 is moved in the direction of the arrow c' and then of the arrow b' from the cassette playing position to the cassette receiving position to transport the cassette 1 from the cassette playing position back to the cassette receiving position, the various components individually operate reversely. Also during such reverse operation, the cassette insertion detecting switch 3 is left in an on-state.

Then, when the cassette 1 is removed in the direction of the arrow a' from the cassette holder 2 moved back to the cassette receiving position, as indicated by an alternate long and short dash line in FIG. 3, the cassette insertion detecting member 26 is moved in the direction of the arrow a' through the distance S by the spring 29 to move the actuating lever 25 in the direction of the arrow e' back to the cassette non-insertion detecting position P1. Thereupon, the third link 13 of the parallel quadrilateral link mechanism 19 is moved in the direction of the arrow d' back to the switch non-operating position P3 to remove the switch operating element 22 thereon from the gap 3c of the cassette insertion detecting switch 3 thereby to allow light from the light emitting element 3a of the cassette insertion detecting switch 3 to be received again by the light receiving element 3b to switch the cassette insertion detecting switch 3 back into an off-state.

Accordingly, if it happens that, after a cassette 1 is inserted into the cassette holder 2 and then the cassette holder 2 starts its movement in the direction of the arrow b, the cassette 1 is, for example, inadvertently held by hand so that the cassette holder 2 leaves the cassette 1 at the cassette receiving position as indicated by an alternate long and short dash line in FIG. 3, then the cassette detecting member 26 is moved back in the direction of the arrow a' on the cassette holder 2 by the spring 29. Thereupon, the cassette insertion detecting switch 3 is switched back into an off-state. As a result, the cassette holder 2 is moved back immediately in the direction of the arrow b' to the cassette receiving position by the cassette holder actuating mechanism.

Thus, with the cassette loading apparatus described above, insertion of a cassette 1 into the cassette holder 2 can be detected by means of the cassette insertion detecting switch 3 mounted on the guide plate 8 which is a stationary section of the video tape recorder. Since the cassette insertion detecting switch 3 is mounted on such stationary section, a flexible harness need not at all be employed in order to establish electric connection to the cassette insertion detecting switch 3.

It is to be noted that, while the cassette loading apparatus in the embodiment described above is incorporated in the video tape recorder, a cassette loading apparatus according to the present invention can naturally be applied to various recording and/or reproducing apparatus in which a cassette is employed.

Having now fully described the invention, it will be apparent to one of ordinary skill in the art that many changes and modifications can be made thereto without departing from the spirit and scope of the invention as set forth herein.

What is claimed is:

1. A cassette loading apparatus for a video tape recorder comprising:
    a cassette holder for moving a cassette between a cassette receiving position at which a cassette is inserted into or removed from said cassette holder and a cassette playing position at which the cassette is recorded or reproduced;
    a cassette insertion detecting switch mounted on a stationary section of said cassette loading apparatus for detecting insertion of a cassette into said cassette holder;
    a parallel quadrilateral link mechanism including first, second, third and fourth links connected for pivotal motion relative to each other by first, second, third and fourth connecting pins so as to form a parallelogram in which said first and second links extend in parallel to each other while said third and fourth links extend in parallel to each other, said first connecting pin being mounted on said stationary section, said first link being connected to said first connecting pin, said first and second links having first and second elongated holes formed along the length thereof, respectively;
    a switch operating element provided on said third link connected to said first connecting pin for operating said cassette insertion detecting switch between on- and off-states upon pivotal motion of said third link around said first connecting pin; and
    an actuating lever having first and second fitting pins secured thereto and loosely fitted in said first and second elongated holes of said first and second links, respectively, in such a manner as to extend in parallel to said third link, said actuating lever being mounted for pivotal motion on said cassette holder by means of said first fitting pin, said actuating lever being positioned so as to be operated by a cassette inserted into said cassette holder to move between a cassette non-insertion detecting position at which said cassette insertion detecting switch assumes an off-state and a cassette insertion detecting position at which said cassette insertion detecting switch assumes an on-state.

2. A cassette loading apparatus according to claim 1, further comprising a cassette insertion detecting member mounted for movement on said cassette holder for being moved by a cassette inserted into said cassette holder, said cassette insertion detecting member being operatively connected to said actuating lever.

3. A cassette loading apparatus according to claim 2, wherein said cassette insertion detecting member and said actuating lever are interconnected by a pin-and-slot connection.

4. A cassette loading apparatus according to claim 1, wherein said cassette holder is first moved in a first direction and then in a second direction perpendicular to the first direction, and said parallel quadrilateral link mechanism operates upon movement of said cassette holder such that, upon movement of said cassette holder in the first direction, said third link is pivoted from a first to a second position around said first connecting pin while said first link remains at its first position, and then upon subsequent movement of said cassette holder in the second direction, said first link is pivoted from the first position to a second position while said third link remains at the second position.

* * * * *